United States Patent [19]
Wilder

[11] 3,839,275
[45] Oct. 1, 1974

[54] PRESERVING RUBBER WITH N-(1,4-DIMETHYLAMYL)-N'-PHENYL PARA-PHENYLENEDIAMINE

[75] Inventor: Gene R. Wilder, Medina, Ohio

[73] Assignee: Monsanto Company, St. Louis, Mo.

[22] Filed: Nov. 9, 1970

[21] Appl. No.: 88,135

Related U.S. Application Data

[63] Continuation of Ser. No. 355,473, March 27, 1964, abandoned, which is a continuation-in-part of Ser. No. 274,815, April 22, 1963, abandoned.

[52] U.S. Cl. ............................ 260/45.9 R, 260/801
[51] Int. Cl. ............................................ C08f 45/60

[58] Field of Search ................................... 260/45.9

[56] References Cited
UNITED STATES PATENTS
3,163,616   12/1964   Stahly .............................. 260/45.9

*Primary Examiner*—Donald E. Czaja
*Assistant Examiner*—Eugene C. Rzucidlo

[57] ABSTRACT

Preserved rubber having minimal toxicity to human skin containing an antidegradant amount of N-(1,3-dimethylbutyl)-N'-phenyl-*p*-phenylenediamine or N-(1,4-dimethylamyl)-N'-phenyl-*p*-phenylenediamine.

3 Claims, No Drawings

PRESERVING RUBBER WITH N-(1,4-DIMETHYLAMYL)-N'-PHENYL PARA-PHENYLENEDIAMINE

This application is a continuation of application Ser. No. 355,473 filed Mar. 27, 1964 now abandoned which is a continuation-in-part of application Ser. No. 274,815 filed Apr. 22, 1963, now abandoned.

This invention relates to the preservation of diene rubbers and to improved antidegradants.

An acceptable rubber antidegradant must meet a variety of requirements. Incorporation presents special problems. Whereas natural rubber latex is protected by natural antioxidants, it is necessary to add a preservative to synthetic diene rubbers as soon as they are formed. They must be protected from change resulting from oxidation, depolymerization, cross-linking and continued polymerization. Because styrene-butadiene copolymer rubber (SBR) is made by emulsion polymerization, the rubber is first obtained in latex form. The antidegradant normally is added to the latex in which the external phase is water but must find its way into the organic rubber phase. Dispersibility and ability to penetrate the rubber are required for which properties liquid form is desirable. Low water solubility and conversely high solubility in the rubber phase are vital in order to achieve quantitative or near quantitative incorporation into the rubber upon coagulation of the latex. Coagulation is normally effected by acidic salt solution and therefore the antidegradant must be stable to acid and possess low solubility in the aqueous acid medium.

Absence of toxicity is another important requirement. During processing the rubber comes into contact with the operators and frequently the finished rubber article comes into contact with the user. The presence of toxic ingredients in the rubber is therefore most undesirable. Low volatility is important both to avoid toxic effects and prevent loss of protection. Rapid mixing, vital to mass production techniques, causes high processing temperatures and some antidegradants when present in the hot rubber have caused severe skin burns and irritation from exposure to the vapors. Similarly, volatility of the antidegradant results in lowering the service life of the rubber article and staining of light-colored articles in contact with rubber containing it.

There is demand for antidegradants which prevent aging due to absorption of oxygen from the atmosphere and prevent exposure cracking due to ozone. The problem of exposure cracking is especially acute with synthetic rubbers because vulcanizates thereof are more susceptible to this type of degradation than natural rubber vulcanizates. Most adjuvants now used to preserve unvulcanized synthetic rubbers either do not inhibit exposure cracking or are not stable enough to withstand the vulcanization process. This invention provides effective nontoxic preservatives which can be incorporated into the synthetic rubber at completion of the manufacture to preserve the unvulcanized rubber and which carry over into the vulcanized product to inhibit exposure cracking and aging.

It has long been recognized that N-alkyl-N'-phenyl-$p$-phenylenediamines inhibit the aging of natural rubber. More recently, it was found that N-isopropyl-N'-phenyl-$p$-phenylenediamine inhibits exposure cracking of synthetic rubber vulcanizates and this compound has come into considerable commercial use for this purpose. However, it is a skin sensitizer and volatile enough to cause numerous cases of skin eruption among workers processing the rubber. Moreover, it is much too soluble in the aqueous coagulation medium used for SBR to be considered for protecting unvulcanized SBR.

It has now been discovered that there is a dramatic disappearance of toxicity if the alkyl substituents contain six or seven carbon atoms. Whereas N-sec.-butyl-N'-phenyl-$p$-phenylenediamine is comparable to the corresponding N-isopropyl compound in its toxicity, toxicity completely disappears upon replacing the lower secondary alkyl groups with secondary alkyl groups containing six or seven carbon atoms. Tests of various rubber formulations on fifty human subjects demonstrated that the compounds were neither primary irritants nor skin-burning agents. These chemicals did not produce any sensitization in the fifty humans tested.

Dermatitic effects were studied on a series of N-alkyl-N'-phenyl-$p$-phenylenediamines where the alkyl group varied from three to eight carbon atoms. 10 human volunteer subjects who had been previously sensitized to N-sec.-butyl-N'-phenyl-$p$-phenylenediamine were used in evaluating each chemical. A rubber sample containing the test chemical was applied to the skin of the volunteers for 24 hours. The rubber samples were then removed and the maximum reactions during the 72-hour period after removal were noted and recorded. Numerical ratings were assigned and recorded on a scale of 0–4 where higher numbers indicated increasing severity of reaction and then reassigned on the basis of weighted ratings as follows in order to express the data on a scale of 0–100, on which the blank rubber stock containing no added chemical was 100:

| Rating | Weighted Rating | |
|---|---|---|
| 0 | 10 | No reaction |
| 1 | 8 | Very slight reddening |
| 2 | 6 | Definite reddening with slight swelling |
| 3 | 4 | Severe reddening and severe swelling |
| 4 | 2 | Weeping blister and severe reddening |

A zero rating was observed on all of the 10 subjects for the rubber containing no added chemical. Accordingly, multiplying the weighted rating (10) by the 10 subjects in that category provided an overall rating of 100 for the blank stock. The number of persons assigned to each of the five categories, after being exposed to rubber containing a chemical was multiplied by the weighted rating for that category and the results totalled to provide an overall rating for the chemical. The results follow:

| Alkyl Radical | Overall Toxicity Rating on Basis of Blank as 100 |
|---|---|
| isopropyl | 56 |
| sec. butyl | 61 |
| sec. amyl | 67 |
| sec. hexyl | 94 |
| sec. heptyl | 88 |
| sec. octyl | 71 |

The antidegradants enter essentially quantitatively into the rubber phase of SBR rubber. For example, tests were conducted by adding antidegradant in amount of 1 percent by weight of the benzene to a mixture of 5 ml. of benzene and 100 ml. of aqueous hydrochloric acid salt solution. One salt solution used had a pH about the middle of the range normally encountered in commercial operations and another had a pH slightly below that range. The mixtures were vigorously shaken until equilibrium was reached and the partition between the aqueous and organic phases determined. Results were as follows where the figures recorded are percent of the antidegradant in the aqueous phase.

| Antidegradant | % In Aqueous Phase pH 1.75 | 3 |
|---|---|---|
| N-sec.-Butyl-N'-phenyl-p-phenylenediamine | 83 | 33.2 |
| N-sec.-Hexyl-N'-phenyl-p-phenylenediamine | 22.5 | 4.3 |

It is apparent that at a pH of 3 essentially all of the N-sec.-hexyl-N'-phenyl-p-phenylenediamine enters the organic phase. The presence of this compound in unvulcanized styrene-butadiene copolymer rubber preserves the rubber from cross-linking and hardening during storage and processing. The antidegradants of this invention are obtainable from readily available raw materials by well-known production techniques. They may be prepared for example by reductive alkylation of p-nitro- or p-amino-diphenylamine with methyl ethyl ketone, 2-octanone, or methyl isoamyl ketone. Examples are:

N-(1,3-dimethylbutyl)-N'-phenyl-p-phenylenediamine
N-(1,4-dimethylpentyl)-N'-phenyl-p-phenylenediamine
N-(1,3-dimethylpentyl)-N'-phenyl-p-phenylenediamine
N-(1-methylpentyl)-N'-phenyl-p-phenylenediamine They are emulsifiable products stable enough to withstand vulcanization temperatures. Although normally obtained as liquids, they can be induced to crystallize to low-melting solids on standing with appropriate seeding.

The resistance to degradation of SBR by ozone imparted by the new antidegradants is similar to that imparted by the toxic lower homologues although there is a decline in potency as the series is ascended and the effect soon becomes significant. While N-(1,3-dimethylbutyl)-N'-phenyl-p-phenylenediamine consistently exhibited 90 percent or more of the antiozonant effectiveness of lower homologues, compounds containing eight carbon atoms in the secondary alkyl group were only two-thirds as effective. Introduction of alkyl into the other nitrogen substituent of the aforesaid compound was even more detrimental. For example, N-(1,3-dimethylbutyl)-N'-p-tolyl-p-phenylenediamine was only about 70 percent as effective in resisting ozone under static conditions. To demonstrate, anti-exposure cracking tests were conducted by the stress-relaxation method for measuring ozone cracking described by Decker and Wise in Rubber World, April, 1962, pages 66–69. Accelerated tests were performed in an ozone chamber under dynamic conditions in order to simulate conditions encountered in service. The test stock comprised:

| | Parts by Weight |
|---|---|
| SBR 1500 rubber | 100 |
| Carbon black (HAF) | 50 |
| Zinc oxide | 4 |
| Stearic acid | 2 |
| Hydrocarbon softener | 10 |
| N-tert-Butyl-2-benzothiazole-sulfenamide | 1 |
| Sulfur | 1.75 |
| Antidegradant | 1.5 |

SBR 1500 rubber is styrene-butadiene copolymer rubber made at 41° F., the bound styrene content of which is 23.5 percent. The stocks so compounded were cured in the usual manner by heating in a press at 144° C. and the optimum cures alternately stretched and relaxed on a reciprocating mechanism which imparted 25 percent strain to the test pieces 90 times each minute in an atmosphere which contained approximately 25 parts $O_3$ per hundred million. The extent of cracking in a test piece was determined by measuring the forces required to extend the test pieces 100 percent before and after exposure to ozone. As the strips began to crack, the number of stress-supporting rubber chains decreased and the force required to extend the strip 100 percent was reduced. The ratio of this force to the original force was calculated and the ability of the rubber to resist ozone cracking was obtained by a comparison of these numbers. These ratios are referred to as percent of the original modulus.

| Antidegradant | Hours to Indicated Percent of Original Modulus | | |
|---|---|---|---|
| | 70% | 80% | 90% |
| None | 9 | 6 | 3 |
| N-sec.-Butyl-N'-phenyl-p-phenylenediamine | 37 | 26 | 14 |
| N-(1,3-Dimethylbutyl)-N'-phenyl-p-phenylenediamine | 33 | 23 | 12 |
| N-(1,4-Dimethylamyl)-N'-phenyl-p-phenylenediamine | 31 | 22 | 11 |
| N-(1-Ethyl-3-methylamyl)-N'-phenyl-p-phenylenediamine | 29 | 20 | 10 |

As further illustrative of the invention, exposure cracking tests were carried out with a mixture of synthetic polybutadiene rubber and natural rubber. The synthetic polybutadiene contained approximately 50 percent cis-polybutadiene. The formulation comprised:

| | Parts by weight |
|---|---|
| Smoked sheets | 50 |
| Polybutadiene (Diene Rubber) | 50 |
| Carbon black (HAF) | 50 |
| Zinc oxide | 3 |
| Stearic acid | 2.6 |
| Aromatic processing oil | 15 |
| Sulfur | 2.4 |
| N-tert.-Butyl-2-benzothiazolesulfenamide | 0.5 |
| Antidegradant | 2.0 |

The formulations were vulcanized in the usual manner and the vulcanized products aged 48 hours at 100° C. in circulating air. Anti-exposure cracking tests by the stress-relaxation method were then carried out as described above.

| Antidegradant | Hours to Indicated Percent of Original Modulus | | |
|---|---|---|---|
| | 70% | 80% | 90% |
| None | 13 | 7 | 3 |
| N-Isopropyl-N'-phenyl-p-phenylenediamine | 30 | 19 | 9 |
| N-(1,3-Dimethylbutyl)-N'-phenyl-p-phenylenediamine | 33 | 21 | 10 |

To illustrate preservation of unvulcanized polybutadiene a 6 percent polybutadiene toluene cement (hydrocarbon >90 percent cis) was used. Antidegradant (0.5 percent of the rubber hydrocarbon) was dissolved in the cement and the toluene removed by steam distillation. The wet ball of elastomer was collected and dried by milling at 105° C. for 5 minutes. The rolls were then chilled to 20°–25° C. and the rubber sheeted out thinly. Viscosity change after aging at 100° C. in a circulating air oven was followed by means of a Mooney plastometer.

| Antidegradant | Mooney Plasticity After Aging | | | |
|---|---|---|---|---|
| | 0 Hrs. | 16 Hrs. | 24 Hrs. | 48 Hrs. |
| N-Isopropyl-N'-phenyl-p-phenylenediamine | 38 | 44 | 45 | 48 |
| N-(1,3-Dimethylbutyl)-N'-phenyl-p-phenylenediamine | 38 | 47 | 51 | 60 |

The unprotected composition cannot even be evaluated. It disintegrates to crumbs during drying.

In general, the antidegradants of this invention are valuable for the preservation of sulfur-vulcanizable diene rubbers—especially those unsaturated rubbers containing more than 50 percent diene hydrocarbon are preferred. This group of preferred rubbers includes natural rubber, styrene-butadiene copolymer rubber, and the various stereo specific polymerized dienes--as for example, cis-polybutadiene and cis-polyisoprene. The amount to use will vary, depending upon the particular formulation and the purpose of the compounder, but in general will fall within the range of 0.1–5 percent of the rubber content. The stereo specific rubbers are normally obtained as cements, and it is preferred to add the antidegradant to the cement immediately after polymerization has been completed. These rubbers deteriorate rapidly unless adequately protected. Protection of natural rubbers was demonstrated in formulations comprising:

| | Parts by Weight |
|---|---|
| Smoked sheets | 100 |
| Carbon black (HAF) | 50 |
| Zinc oxide | 5 |
| Stearic acid | 3 |
| Saturated hydrocarbon softener | 3 |
| Sulfur | 2.5 |
| N-tert-Butyl-2-benzothiazole sulfenamide | 0.5 |
| Antidegradant | 1.5 |

The formulations were vulcanized in a press in the usual manner by heating 45 minutes at 144° C. The vulcanizates were then artificially aged by heating for 72 hours in a circulating air oven at 100° C. and for 7 days in a bomb under 300 pounds oxygen pressure per square inch. The percentage of the original tensile retained after aging was determined. The vulcanizates were also flexed at 25° C. in an atmosphere containing 25 ± 5 parts of ozone per 100 million parts of air until a crack appeared.

| Antidegradant | % Tensile Retained After Aging | | Ozone Resistance |
|---|---|---|---|
| | 100°C. in air | 70°C. in oxygen | Hrs. Until Cracked |
| None | 10 | 0 | 12 |
| N-(1,3-Dimethyl butyl) N'-phenyl-p-phenylenediamine | 53 | 47 | 72 |
| N-(1-Isobutyl-3-methylbutyl)-N'-phenyl-p-phenylenediamine | 45 | 42 | 60 |

It will be noted that increasing the number of carbon atoms in the alkyl chain reduced the effectiveness.

It is intended to cover all changes and modifications of the examples of the invention herein chosen for purposes of disclosure which do not constitute departures from the spirit and scope of the invention.

What is claimed is:

1. Preserved rubber having minimal toxicity to human skin comprising sulfur vulcanizable diene rubber having incorporated therein an amount sufficient to inhibit degradation of N-(1,4-dimethylamyl)-N'-phenyl-p-phenylenediamine the rubber containing said adjuvant being neither a primary irritant nor a sensitizing agent.

2. Preserved rubber of claim 1 wherein the rubber is synthetic sulfur vulcanizable diene hydrocarbon rubber.

3. Preserved rubber having minimal toxicity to human skin comprising sulfur vulcanizable diene hydrocarbon rubber having incorporated therein 0.1 to 5 percent of the weight of the hydrocarbon of N-(1,4-dimethylamyl)-N'-phenyl-p-phenylenediamine the rubber containing said adjuvant being neither a primary irritant nor a sensitizing agent.

* * * * *